April 17, 1934.        P. M. KELLY         1,955,635
PNEUMATIC JACK
Filed Nov. 6, 1930
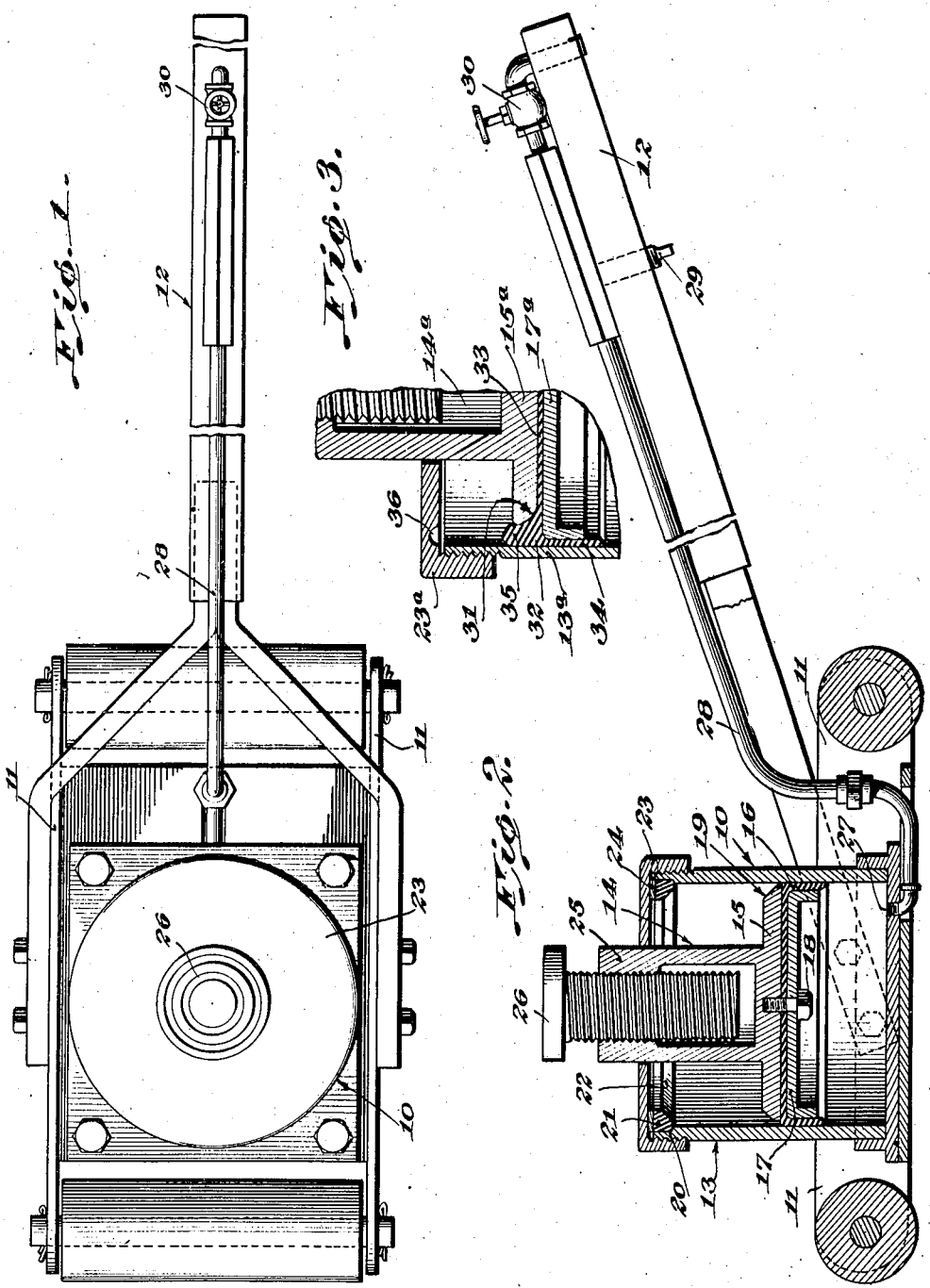
INVENTOR
P.M.Kelly,
BY
ATTORNEY Patented Apr. 17, 1934

1,955,635

UNITED STATES PATENT OFFICE 1,955,635

PNEUMATIC JACK

Pascal M. Kelly, El Paso, Tex.

Application November 6, 1930, Serial No. 493,881

2 Claims. (Cl. 254—93)

My invention relates to pneumatic jacks and it consists in the constructions, arrangements and combinations herein described and claimed.

It is an object of my invention to provide a pneumatic jack in which an efficient air seal is effected between the cylinder and piston.

It is a further object of the invention to provide means upon the piston which coacts with the head of the cylinder for effecting an air tight seal, thus obviating any possibility of lowering of the jack through leakage of air passing the piston.

Additional objects, advantages and features of the invention will be apparent from the following description considered in conjunction with the accompanying drawing, wherein:

Figure 1 is a top plan view of a jack constructed in accordance with my invention.

Figure 2 is a vertical sectional view thereof illustrating the piston and packing.

Figure 3 is a fragmentary detail illustrating a modified form of packing.

There is illustrated a pneumatic jack generally indicated by the reference character 10, which may be of any well known construction, embodying a wheeled frame 11 and draft tongue 12.

A cylinder 13 is mounted in any desired manner upon the frame 11 and reciprocable within the cylinder there is a piston 14. The piston includes a head 15 upon which there is secured a leather packing cup 16 retained in position by a suitable metallic cup 17 and screw 18.

The head 15 of the piston has a bevelled circumferential face 19 for a purpose to be explained hereinafter.

The upper part of the cylinder 13 is provided with an annular recess 20 within which there is disposed a compressible packing ring 21. The packing ring 21 projects beyond the recess 20 and the interior of the ring is provided with a bevelled face 22, complemental to the face 19 to the piston head 15.

The cylinder 13 is screw threaded at its upper end and receives a cap 23 for closing the cylinder. If desired a metallic washer 24 may be interposed between the cap 23 and ring 21, to securely retain the ring 21 in position.

The cap 23 is centrally apertured to receive the piston rod 25 slidably therethrough, as shown. The piston rod is hollow and is interiorly threaded for reception of a threaded jack head 26. By this construction, it will be apparent that the jack head 26 may be adjusted vertically, as desired.

The piston 14 is elevated through any suitable source of air under pressure and as shown, air enters the cylinder 13 at 27 through a pipe 28. Air is supplied to the pipe 28 through the valve 29. An air release valve 30 is associated with the pipe 28, so that by opening the valve 30 air will be permitted to escape and the jack will be lowered.

The operation of the jack will be apparent. Air admitted through the pipe 28 will raise the piston 14 upwardly until the bevelled face 19 of the piston 14 engages the bevelled face 22 of the packing ring 21 and exerts such force as to compress the ring 21, producing a tight joint between the contacting bevelled faces. Thus, if any air should leak past the cup 16 the snug contact between the abutting faces of the piston and packing will prevent passage of air above the piston 14, and thereby positively retain the jack in elevated position.

In the form shown in Fig. 3, the cylinder 13ª is constructed as before described with the exception that the annular recess and packing ring is omitted. The piston head 15ª is of lesser diameter than the metallic retaining cup 17ª and has an annular lower face rounded as at 31. A cup washer 32 is secured upon the head 15ª by the metallic cup 17ª and screw 18, as before described.

The cup washer in the present instance, comprises a main body 33 having a downwardly projecting continuous flange 34 and upwardly projecting rim 35. The rim 35 is quite thick and is compressed between the rounded lower face of the piston head 15ª and the metallic washer 17ª. The rim 35 projects above the upper face of the piston head and is adapted to engage within an annular groove 36 formed in the underside of the cap 23ª.

In this form of packing, it will be apparent that when the piston 14ª is forced to its outermost position, the rim 35 of the piston will be compressed in the annular groove 36, thus effectively sealing the piston against leakage of air there-past.

Without further description it is thought that the features and advantages of the invention will be readily apparent to those skilled in the art, and it will be, of course, understood that changes in form, proportion and minor details of the construction may be resorted to, without departing from the spirit of the invention or of its scope as claimed.

I claim:

1. In a pneumatic jack, a cylinder, a cap for closing the upper end of the cylinder, the upper end of said cylinder being provided with an annular groove, a piston reciprocable in said cylinder, and a packing ring carried by said cylinder for compression in said groove upon outermost movement of said piston.

2. In a pneumatic jack, a cylinder having an annular recess adjacent one end thereof, a closure cap for said cylinder, a piston reciprocable in said cylinder and including a head of a diameter slightly less than said cylinder, said head having an inwardly bevelled face, a packing ring secured between said recess and cap and free of contact with said piston, said ring projecting inwardly from said cylinder a short distance and having an inwardly bevelled face complemental to the bevel face of said head, whereby to effect an airtight seal between said head and said ring at times.

PASCAL M. KELLY.